United States Patent [19]

Urabe

[11] Patent Number: 4,606,613
[45] Date of Patent: Aug. 19, 1986

[54] LIQUID CRYSTAL DISPLAY DEVICE CONTAINING LASER-ABSORBING DYE

[75] Inventor: Tetsuo Urabe, Tokyo, Japan

[73] Assignee: Sony Corporation, Tokyo, Japan

[21] Appl. No.: 603,748

[22] Filed: Apr. 25, 1984

[30] Foreign Application Priority Data

Apr. 26, 1983 [JP] Japan ................. 58-73322

[51] Int. Cl.$^4$ ............................................. G02F 1/13
[52] U.S. Cl. ......................................... 350/349; 350/351
[58] Field of Search ............................... 350/349, 351

[56] References Cited

U.S. PATENT DOCUMENTS 4,040,047 8/1977 Hareng et al. ................. 350/351 X
4,465,338 8/1984 Coates ............................ 350/351 X

OTHER PUBLICATIONS

Balanson, R. et al., "Sensitivity Improvement in Thermally-Addressed LCD...", *IBM Tech. Disc. Bull.*, vol. 21, No. 5, (Oct. 1978), p. 2007.

Cheng, Y. Y. et al., "Solubilized Squarilium Dyes for LCDs," *IBM Tech. Disc. Bull.*, vol. 23, No. 1, (Jun. 1980), p. 309.

Tani, C. et al., "New Electrothermo-Optic Effect in a Certain Smectic Liquid Crystal with a Pleochroic Dye," *Applied Phys. Lett.*, vol. 33, No. 4 (Aug. 15, 1978), pp. 275-277.

Primary Examiner—John K. Corbin
Assistant Examiner—Richard F. Gallivan
Attorney, Agent, or Firm—Hill, Van Santen, Steadman & Simpson

[57] ABSTRACT

A liquid crystal display device comprising a laser beam source, a liquid crystal cell so formed that a liquid crystal layer in which a liquid crystal of cyano-biphenyl system is added with a dichromatic dye of 1,3 di (1,4-dimethyl-7-isopropylazulenyl)-cyclobutene diylium having a formula

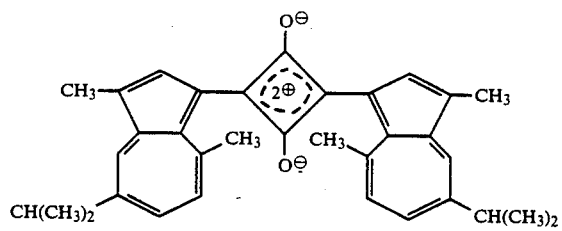

is interposed between opposing transparent electrode plates, and means for irradiating to the cell a laser beam generated from the laser beam source.

1 Claim, 5 Drawing Figures

LIQUID CRYSTAL DISPLAY DEVICE CONTAINING LASER-ABSORBING DYE

BACKGROUND OF THE INVENTION

1. Field of the Invention

The present invention relates to a liquid crystal display device.

2. Description of the Prior Art

In the conventional liquid crystal display devices known heretofore, there is a proposed example wherein a liquid crystal cell thereof is subjected to irradiation of a laser beam modulated by video signals or the like representing a desired optical image to be displayed, whereby the optical image is written in the liquid crystal cell.

In effecting such image display with the liquid crystal display device of this type, a laser beam is irradiated to a liquid crystal cell as mentioned above, and the energy resulting from such laser beam is converted into thermal energy to heat the liquid crystal, thereby inducing a phase transition in the heated portion of the liquid crystal. The crystal portion with the phase transition thus caused tends to resume the former phase upon halt of irradiation of the laser beam. In this case, due to subsequent rapid cooling of the heated portion, random molecular alignment produced in the liquid crystal as a result of such phase transition is permitted to remain substantially and therefore a light scattering center is rendered residual in the said portion, whereby the optical image is stored or written in the cell.

In the liquid crystal display device having such a function of writing an optical image with a laser beam, the essential point resides in how to attain high efficiency in converting the writing laser beam energy into thermal energy and transmitting the same to the liquid crystal.

For the purpose of realizing satisfactory writing with efficient conversion of a laser beam into heat, there has been proposed an improvement of adding into the liquid crystal a certain coloring matter or dye which is effective for efficient absorption of the laser beam.

It is highly demanded with regard to the liquid crystal display device of this type to employ a semiconductor laser as a writing beam source in order to achieve dimensional reduction as well as to enhance the merchantability thereof.

Accordingly, the dye to be added into the liquid crystal of such display device needs to satisfy the following conditions. That is, it should:

(1) present an absorption maximum in the wavelength range of a semiconductor laser beam, i.e. in the near-infrared region;
(2) have a sufficiently high absorption maximum;
(3) have a great transmittance in the visible wavelength range;
(4) be soluble in a liquid crystal; and
(5) have dichroism (which will be described later).

According to the prior art, however, none of the liquid crystal display devices adopts addition of a satisfactory dye which meets the above requirements.

In the conventional liquid crystal display devices of this type known heretofore, there is an example using a coloring matter or dye of N-phenyl-O-phenylene diamine nickel. This dye presents an absorption maximum in the near-infrared region and is substantially transparent in the visible wavelength range while having solubility to a liquid crustal. However, because of its low molar absorption coefficient, a large amount of such dye needs to be added at a proportion of 1.5 percent or so by weight to attain required absorption for writing, hence varying the properties of the liquid crystal as a result. Generally, metal chelate compound exhibits such a tendency.

In the meanwhile, some of cyanine dyes have absorptivity in the infrared range and still are soluble in the liquid crystal. Moreover, the molar absorption coefficients thereof are high. On the other hand, there exists a disadvantage of extremely inferior properties with regard to weatherproofness. And due to ionic characteristics of such dyes, a current comes to flow in the liquid crystal when a voltage is applied thereto for erasure, hence deteriorating the service life of the liquid crystal and further exerting harmful influence on the aligning layer of the liquid crystal. Considering such disadvantages, there still remain some problems unsolved in practical application to the liquid crystal display device.

SUMMARY OF THE INVENTION

In view of the circumstances described above, the present invention provides an improved liquid crystal display device which is capable of eliminating the aforesaid disadvantages.

In this invention, a semiconductor laser is employed to generate a writing light beam, and a liquid crystal cell is formed by adding into a liquid crystal of cyano-biphenyl system a squarylium dye of 1,3 di (1,4-dimethyl-7-isopropylazulenyl)-cyclobutene diylium which satisfies the aforementioned conditions (1) through (5) and is represented by a structural formula

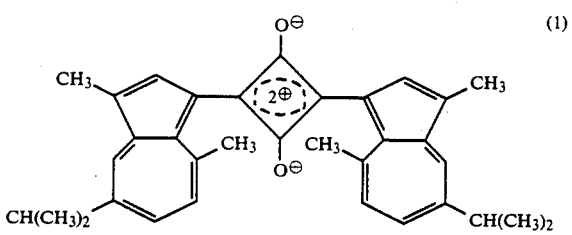

In the liquid crystal display device according to the present invention where a semiconductor laser is used to obtain a writing light beam, it becomes possible to realize a dimensional reduction and a lower power requirement. Since the liquid crystal cell includes the additive dye which satisfies the aforementioned conditions (1) through (5) and has its absorption maximum in the oscillation wavelength range of the semiconductor laser beam, highly efficient absorption of the energy of the writing light beam can be ensured as well as subsequent efficient conduction of such energy to the liquid crystal to perform an excellent writing operation. And in an arrangement with the aforesaid homeotropic alignment, a light scattering center thereof is formed as mentioned previously to render the writing possible with a small-diameter spot, hence raising the resolution to constitute a superior liquid crystal display device.

BRIEF DESCRIPTION OF THE DRAWINGS

In FIG. 1, there are illustrated a laser beam Ls, a liquid crystal cell 6, a liquid crystal layer 5, transparent plates 1 and 2, and electrodes 3 and 4.

DETAILED DESCRIPTION OF THE INVENTION AND PREFERRED EMBODIMENT

An optimal amount of the dye to be added into the liquid crystal is within a range of 0.1 to 0.5 percent by weight thereto. In case the amount is less than 0.1 percent by weight, the absorption of the laser beam becomes insufficient in a writing mode and consequently a great writing power is required; whereas any amount exceeding 0.5 percent by weight may bring about the possibility of inducing precipitation of the dye.

Figure 1:
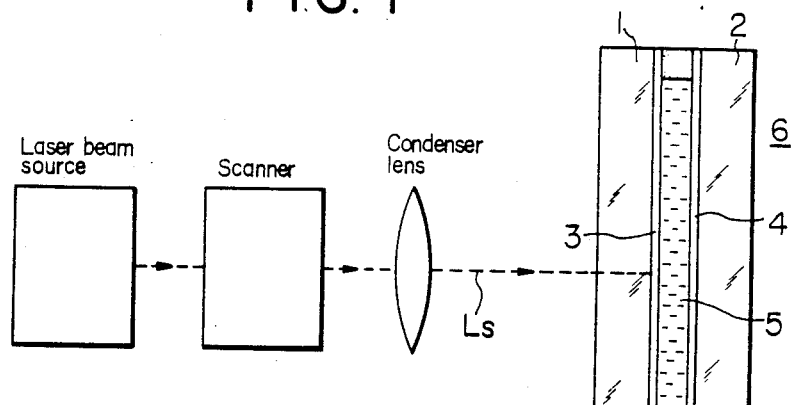
FIG. 1 is an enlarged sectional view of an exemplary liquid crystal display device.

Hereinafter the liquid crystal display device of the present invention will be described with reference to an exemplary embodiment thereof, which has a particular constitution so designed as to achieve a high resolution. As illustrated in FIG. 1, a liquid crystal cell 6 is formed by sandwiching, between transparent electrodes 3 and 4 disposed on the respective inner surfaces of mutually opposed transparent plates 1 and 2 of glass or the like, a liquid crystal layer 5 composed of a liquid crystal of a smectic A phase or a mixture thereof with another liquid crystal of a cholesteric phase with addition of a dye of 1,3 di (1,4-dimethyl-7-isopropylazulenyl)cyclobutene diylium having the aforesaid structural formula.

The liquid crystal may be of cyano-biphenyl system, such as cyanononyl biphenyl or a mixture of cyanooctyl biphenyl 45 mole percent and cyanodecyl biphenyl 55 mole percent. Depending on the temperature, any of such liquid crystals is capable of assuming crystalline state, smectic A phase, nematic phase or isotropic phase. However, it is defined here that the liquid crystal assumes the smectic A phase in a normal condition ready for writing and displaying an optical image.

The liquid crystal layer 5 sandwiched between the two electrodes 3 and 4 selectively determines the molecular alignment in the liquid crystal and the dye to be a homeotropic alignment which is orthogonal to the surfaces of the two electrodes 3 and 4.

Figure 2:
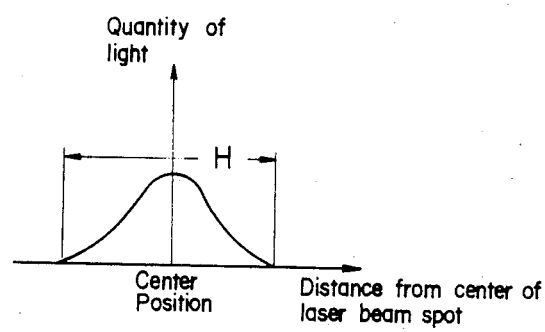
FIGS. 2 and 3 are explanatory diagrams of the device shown in FIG. 1.
Figure 3:
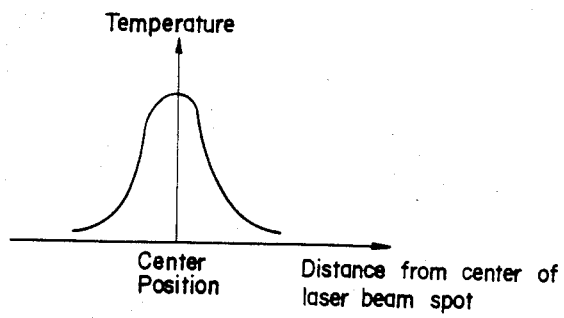

A light beam Ls from a semiconductor laser such as GaAlAs laser (oscillation wavelength: 780 nm) modulated in accordance with a desired optical image to be displayed is irradiated to the liquid crystal layer 5 of the cell 6. Due to the homeotropic alignment of the molecules in the liquid crystal layer 5, its light absorption coefficient in the state prior to such irradiation of the laser beam is relatively small, but the laser beam is partially absorbed although in a small amount. That is, in the laser beam irradiation executed while the beam is condensed on the liquid crystal layer 5, the beam spot has a Gaussian distribution with a certain extension H as shown in FIG. 2, and the light absorption becomes maximum particularly at the center portion of the beam spot where the quantity of light is the greatest, so that the temperature rise in the center portion also becomes maximum to induce a phase transition. In this center portion, the smectic phase changes to a nematic phase and further to an isotropic phase, so that there occurs random molecular alignment in this portion to eventually alter the light absorption coefficient to $\alpha 0$ which is greater than $\alpha\perp$. As a result of such transition to the isotropic phase in the said portion, the laser beam absorption therein is further increased to bring about a sharp temperature rise. Strictly, the absorption coefficient is altered not directly from $\alpha\perp$ to $\alpha 0$ but gradually from the value in the smectic phase through the value in the nematic phase to $\alpha 0$ in the isotropic phase. In this manner, a marked temperature rise occurs in the center portion of the laser beam spot; while in the periphery thereof where such phase transition is not induced, the absorption coefficient remains being $\alpha\perp$ of a small value and therefore the laser beam is not easily absorbable. Consequently, conversion of the laser beam energy into heat effected in this portion is small, so that almost no temperature rise occurs at the base of the laser beam distribution (FIG. 2) where the quantity of the light is relatively small. Accordingly, the temperature difference comes to be conspicuous between the center portion of the beam spot with the phase transition and the peripheral portion thereof without such phase transition. In other words, the temperature distribution curve becomes steep as graphically shown in FIG. 3. Therefore, upon halt of irradiation of the laser beam to such high-temperature portion where the phase transition is existent, the heat is immediately radiated therefrom to achieve effective rapid cooling, hence causing random molecular alignment therein to render the light scattering center residual distinctly in the narrow portion, whereby writing of the desired image can be performed with a high resolution.

In order to enhance the writing efficiency, practically the cell 6 is disposed in an oven or the like in such a manner as to be kept at a predetermined bias temperature lower by several degrees centigrade than the phase transition temperature of the liquid crystal, and the aforesaid writing is executed in such a state.

In the case of using the aforementioned cyanononyl biphenyl for the liquid crystal, since its phase transition to a nematic phase occurs at 48° C. and further to an isotropic phase at 49.5° C., the cell 6 placed in an oven is kept at 43° C. which is slightly lower than the phase transition temperature thereof.

In the manner described above, a desired optical image is written in the liquid crystal cell 6. The image thus written in the cell 6 can be erased by applying an AC electric field between the two transparent electrode plates 3 and 4 where the liquid crystal layer is sandwiched. Therefore, a liquid crystal having positive dielectric anisotropy is suited for use.

When reading out the written image from the liquid crystal cell 6, visible light is irradiated thereto. Then a light scattering center is formed to cause a light transmittance difference between the image-written portion and the other portion, whereby the image is rendered observable.

In the exemplary liquid crystal cell 6 mentioned above, the liquid crystal layer 5 is formed in a thickness of 12 μm with addition of the aforesaid dye in an amount of 0.2 percent by weight to cyanononyl biphenyl.

Figure 4:
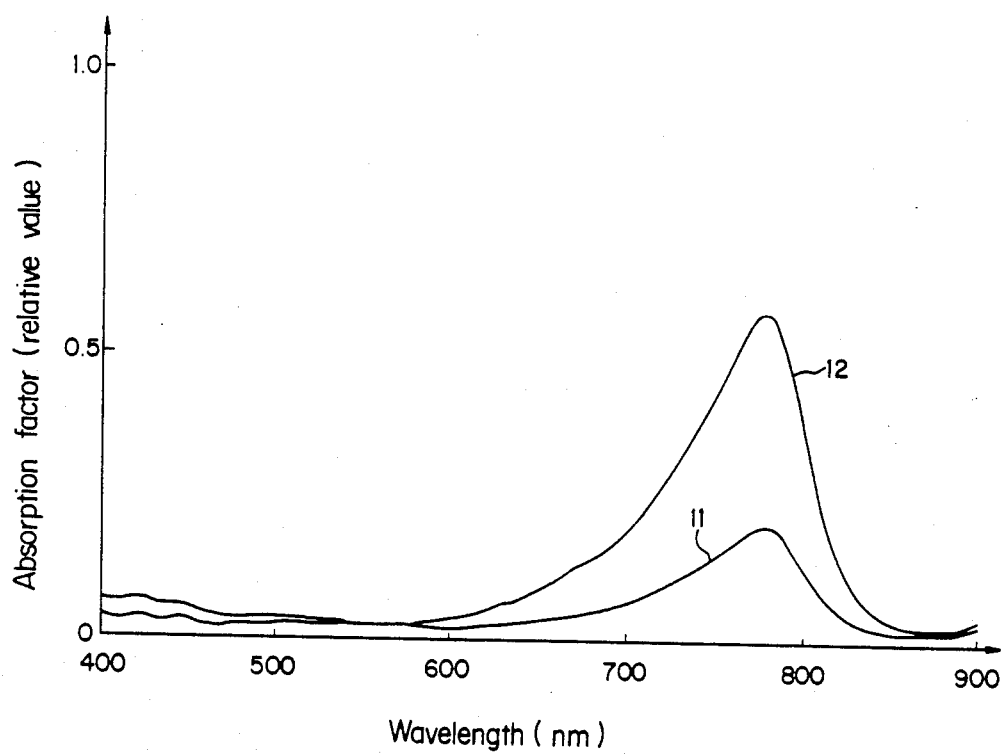
FIG. 4 graphically shows the absorption spectrum of a liquid crystal cell employed in the device of this invention.

The results of measuring the absorption spectra of such cell 6 are graphically shown in FIG. 4. In this graph, a curve 11 represents the absorption spectrum obtained in a normal state or smectic A phase with homeotropic alignment, and a curve 12 represents the absorption spectrum in an isotropic liquid phase with the entirety of the cell 6 warmed. As is obvious from such spectra, the absorption maximum is in a wavelength range of 770 to 780 nm in each case, and a large difference is existent between the maximum values in the two curves 11 and 12, indicating dichroism of great anisotropy. Such molar absorption coefficient is on the order of $10^5$ lmole$^{-1}$cm$^{-1}$ which is substantially equal to the value of the cyanine dye. Absorption in the visible wavelength range is so small that the liquid crystal layer 5 appears to be almost transparent in the cell 6. And it has been confirmed that the properties thereof relative to weatherproofness are superior to those of the cell using a dye of cyanine system.

Figure 5:
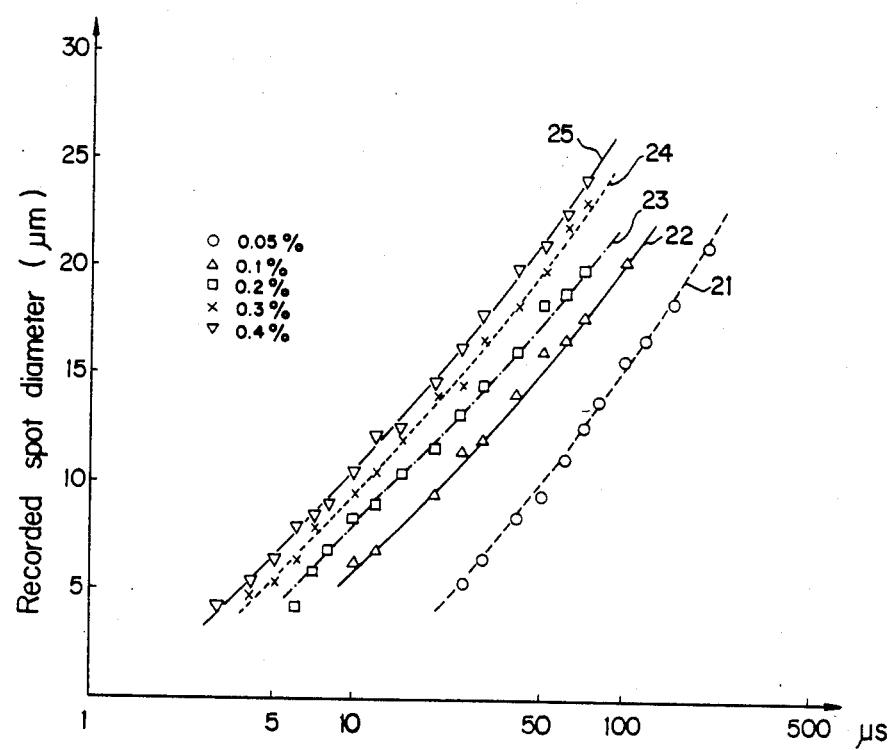
FIG. 5 graphically shows the results of measuring the relationship between a recorded spot diameter and a laser beam pulse width in the device of this invention.

FIG. 5 graphically shows the results of measuring the relationship between the pulse width of a writing laser beam (having a wavelength of 780 nm and a power of 10 mW) and the spot diameter recorded with such laser beam in the liquid crystal cell in the foregoing embodiment while changing the amount of the additive dye. In this graph, curves 21, 22, 23, 24 and 25 respectively represent individual examples in which the aforesaid dye is added at proportions of 0.05, 0.1, 0.2, 0.3 and 0.4 percent by weight.

We claim:

1. A liquid crystal display device comprising a laser beam source, a liquid crystal cell so formed that a liquid crystal layer in which a liquid crystal of cyano-biphenyl system is added with a dichromatic dye of 1,3 di (1,4-dimethyl-7-isopropylazulenyl)-cyclobutene diylium having a formula

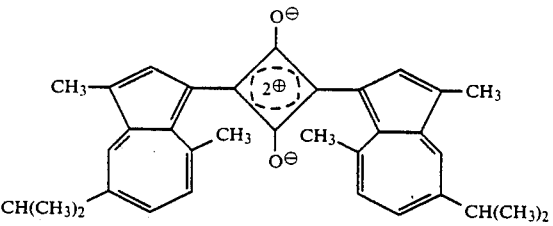

is interposed between opposing transparent electrode plates, and means for irradiating to said cell a laser beam generated from said laser beam source.

* * * * *